Jan. 4, 1949.                    J. KANTOR ET AL                    2,457,903
                              BEVERAGE PREMIX SYSTEM
Filed July 16, 1943                                             3 Sheets-Sheet 1

INVENTORS
James Kantor and
BY: Edward F. Rosenberg
Hood & Hahn
ATTORNEYS

INVENTORS
James Kantor and
Edward F. Rosenberg
BY: Wood & Hahn
ATTORNEYS

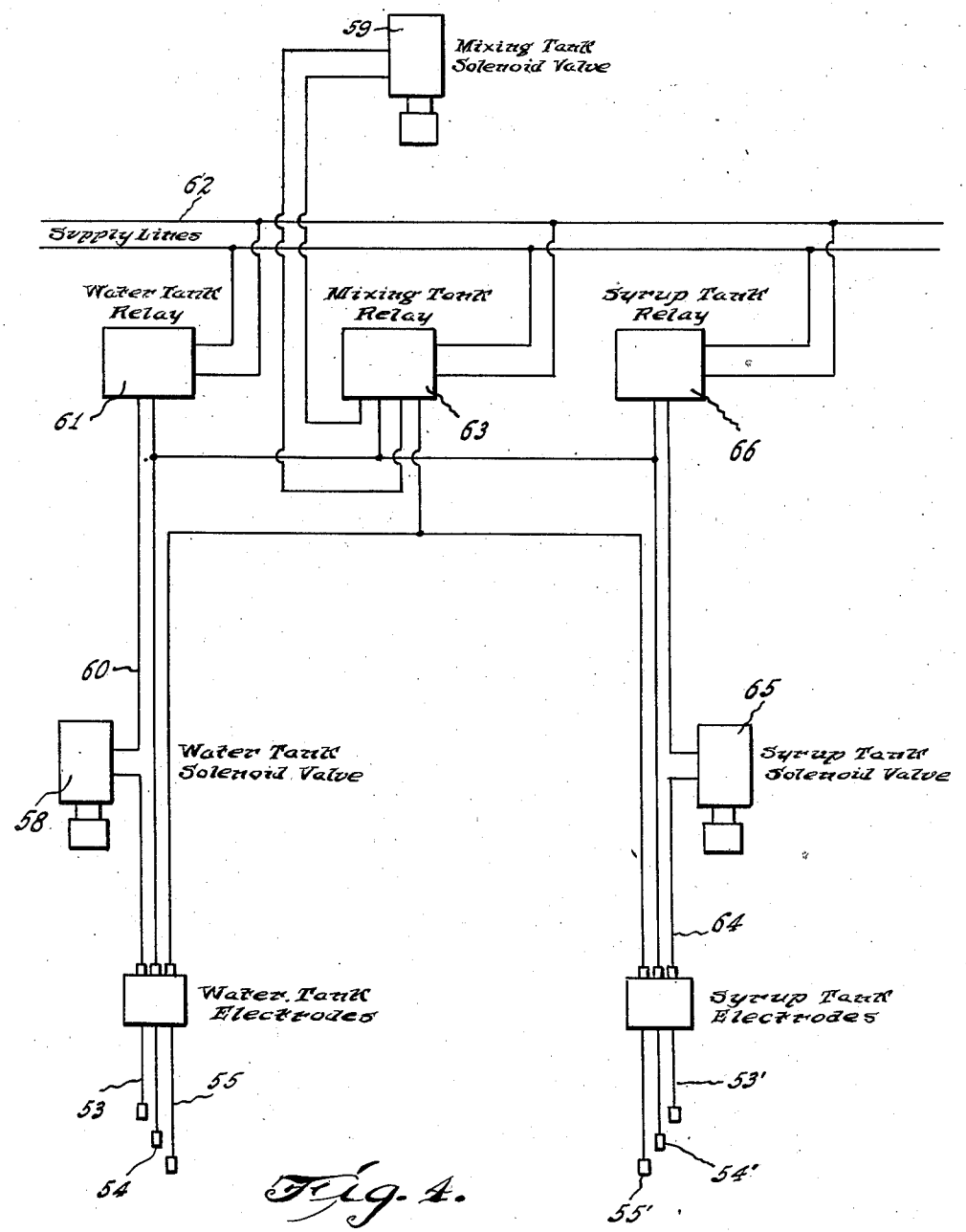

Patented Jan. 4, 1949

2,457,903

UNITED STATES PATENT OFFICE 2,457,903

BEVERAGE PREMIX SYSTEM

James Kantor and Edward F. Rosenberg, Chicago, Ill., assignors to The Liquid Carbonic Corporation, Chicago, Ill., a corporation of Delaware Application July 16, 1943, Serial No. 494,972

9 Claims. (Cl. 183—2.5)

1

The present invention relates to improvements in apparatus for preparing carbonated beverages prior to the bottling of the same.

Heretofore, it has been almost the general commercial practice, in preparing and bottling carbonated beverages, to mix the flavoring with a carbonated water in the bottles. In other words, it has been the general practice, heretofore, to deliver to the bottle or container for the carbonated beverage, a predetermined supply or quantity of flavoring syrup by one filling machine and then by a second machine or by an adjunct filling apparatus, deliver to the bottle or container sufficient carbonated water to fill the container to proper level and to make the proper mix. While apparatus of this character has produced extremely satisfactory results, there are certain disadvantages to such a method, to-wit, the size of the machine or apparatus is materially increased and, furthermore, the syrup itself, having not been carbonated, will absorb a certain proportion of the $CO_2$ of the water and, as a result, the total $CO_2$ contained in the mix may be slightly reduced unless, of course, the carbonated water itself is more highly carbonated. However, to deliver a more highly carbonated water to the container to compensate for the absorption by the syrup is apt to render the water so "lively" that it is sometimes difficult to handle the same without creating foaming in the container and without materially slowing down the filling process.

Furthermore, the mixing of the syrup and water in the container necessitates an additional means for agitating the container to insure a thorough mixing of the syrup and the water in the container, which generally requires additional mechanism.

It is one of the objects of the present invention to provide an apparatus for thoroughly mixing the water and syrup prior to its delivery to the container and to properly carbonate the mixed water and syrup prior to its delivery to the container, whereby a more satisfactory mixture of the materials may be obtained and whereby a more speedy handling and bottling of the carbonated beverage may be attained.

For the purpose of disclosing the invention and method, we have illustrated an apparatus in the accompanying drawings for carrying out the method of mixing the material. In said drawings, Fig. 1 is a longitudinal sectional view, certain of the parts being shown in full, of an apparatus embodying our invention;

2

Fig. 4 is a diagrammatic view showing the circuit arrangement of the apparatus for controlling the flow of material.

Figure 1:
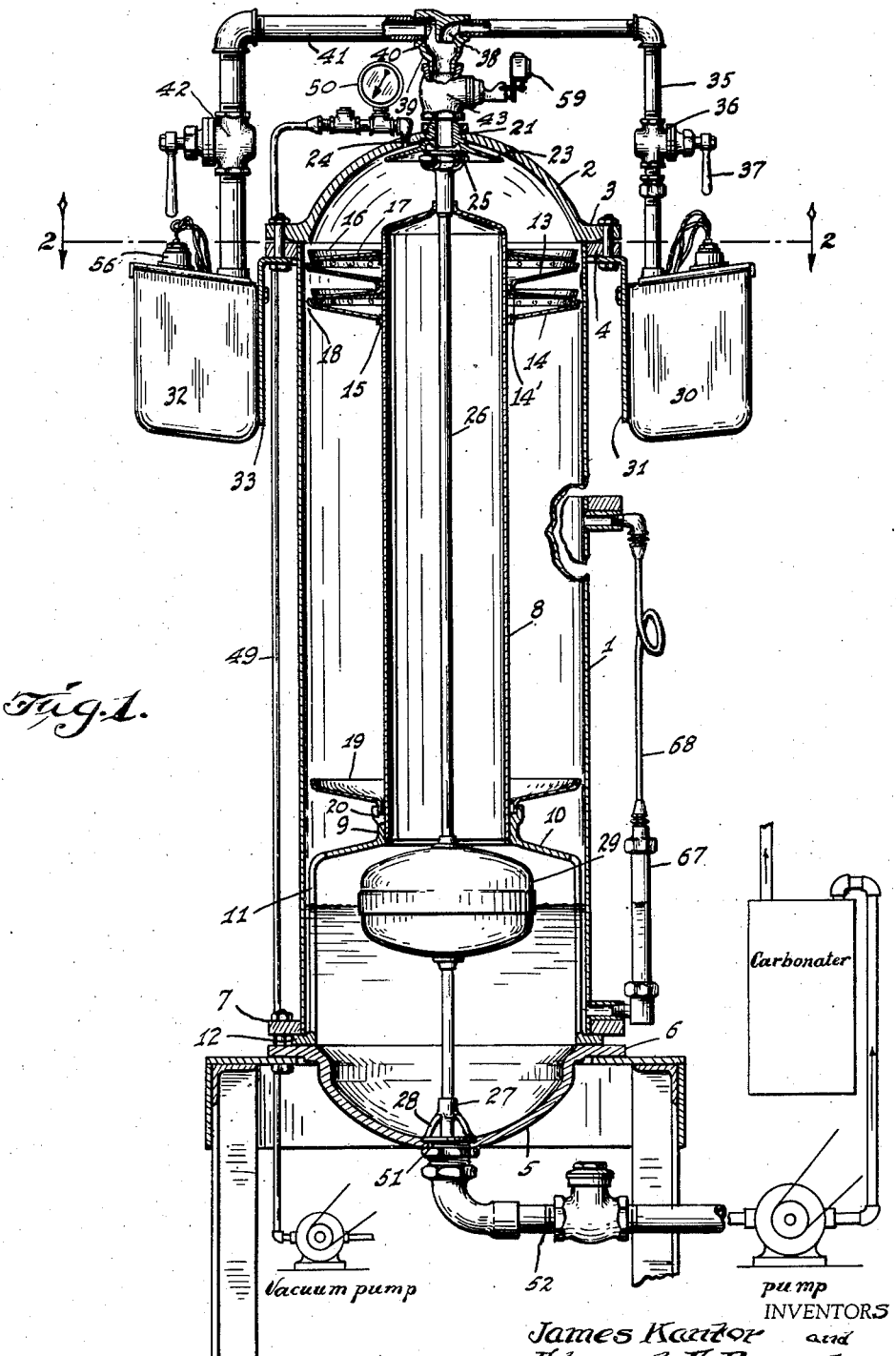
Figure 2:
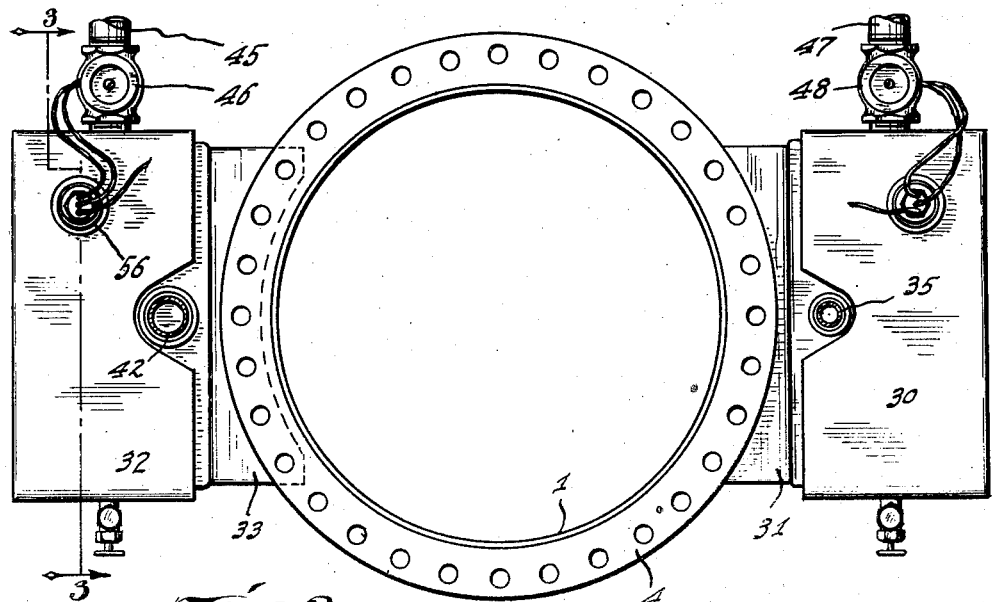
Fig. 2 is a plan view thereof.

In the apparatus illustrated, a mixing tank 1 is provided, which is preferably of cylindrical shape, being closed at its top by a round dome 2 having a flange 3 bolted or otherwise secured to a flange 4 at the top of the tank 1. The bottom of the tank is likewise closed by an inverted dome-shaped bottom 5 having a flange 6 which is bolted or otherwise secured to a flange 7 on the bottom of the cylindrical section or portion 1 of the tank. Within this tank is arranged a preferably tubular or cylindrical column 8 which is mounted, at its lower end, within a neck 9 formed on the top 10 of a spider 11. The legs of this spider are provided with outturned flanges 12 which are clamped between the flanges 6 and 7. At the upper end of the column 8 is provided a plurality of drip pans 13 and 14, one arranged above the other, which surround the column but which, as at 15, are slightly spaced from the column. Each pan is sustained in position by an annular ring 16 supported at the outer end of a pan 17 secured to the column and the ring 16 is located a slight distance within the upturned flange 18 of the pan.

At the bottom of the column is provided a baffle plate or pan 19 somewhat cup-shaped, being supported in the neck 9 of the spider member 11 and spaced apart from the column 8. Escape openings 20 are provided in the neck to permit the outflow of liquid from the pan.

The liquids to be admitted to the tank are delivered through a valve nozzle 21 in the top dome 2 which nozzle is provided with an annular skirt 23 and with a valve seat 24. Cooperating with this valve seat is a valve 25 carried on a float rod 26 extending through the column 8 and guided at its bottom end in a bearing 27 at the top of the spider 28 secured in the bottom dome 5. Carried by this float rod 26 is a float 29 which, when the liquid in the tank reaches a predetermined level, will rise and close the valve 25, shutting off further admission of liquids to the tank.

Figure 3:
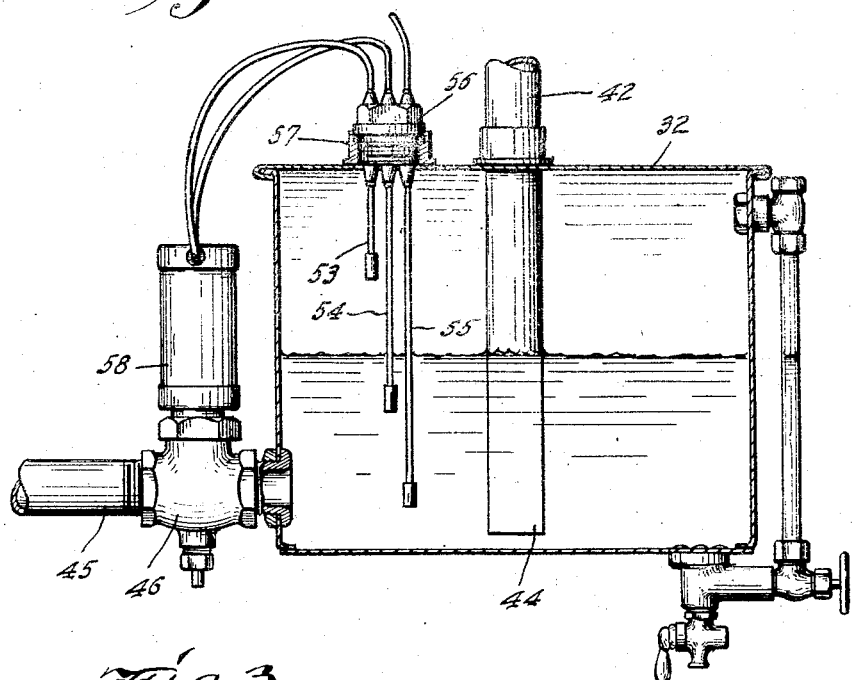
Fig. 3 is a sectional view of one of the tanks, either the syrup, or the water tank.

A syrup tank 30 is supported from a bracket 31 secured to the flange 4 at the top of the tank, which syrup tank is adapted to contain a suitable supply of syrup to be delivered to the mixing tank 1. A water tank 32, similar in construction to the syrup tank is supported on the opposite side of the mixing tank 1 by a bracket 33, likewise supported from the flange 4. The syrup tank 30 delivers to the delivery nozzle 21 and into the tank 1 through a suitable conduit pipe 35 which has arranged therein a calibrating valve 36 provided with a handle 37 for adjusting the valve to permit the syrup to flow at a predetermined rate therethrough. This pipe 35 delivers through a delivery orifice 38 in a coupling 39, which coupling has a second orifice 40 connected with a supply pipe 41 in turn connected to the water tank 32 through a calibrating valve 42 similar in construction and operation to the valve 36. The coupling 40 in turn communicates through a solenoid controlled valve 43 with the inlet nozzle 21. It is to be noted that in each of the tanks the supply pipes 35 and 41 each has an extension 44 which extends almost to the bottom of the tank, as illustrated in Fig. 3.

The water tank 32 is supplied with refrigerated water through the medium of a supply pipe 45 through a suitable solenoid controlled valve 46. The refrigerated water is supplied through this pipe 45 from a source under gravity or a low pump pressure and the supply delivered to the tank is slightly greater than the requirements of the filling unit to which the carbonated mixture is utimately delivered. Likewise, the syrup tank 30 has syrup delivered to it through a supply pipe 47 which is provided with a solenoid controlled valve 48 and the syrup, like the water, is delivered through this supply pipe 47 under gravity or low pump pressure at a rate slightly greater than required to accommodate the filling unit. For drawing the syrup and water into the mixing tank 1, I create in this tank a partial vacuum through the medium of an exhaust tube 49 entering the tank in the dome 2 above the baffle skirt 23 and through a suitable gauge 50. This exhaust pipe 49 is connected with a suitable vacuum pump for maintaining the proper degree of partial vacuum in the mixing tank 1.

The mixing tank 1 is provided with a delivery opening 51 in the bottom dome 5 which communicates with a discharge pipe 52 connected to a suitable pump which delivers to the carbonating apparatus. The pump connecting with the pipe 52 creates a suction or partial vacuum substantially equal to the vacuum within the tank 1 so that the liquid will be delivered from the tank under its own head.

It is to be noted that the pipe 35 leading from the syrup tank 30 is smaller in diameter than the pipe 41 leading from the water tank 32. By the control mechanism hereinafter described, the liquid level and consequently the head in the tanks 30 and 32 is substantially constant. In other words, the heads of the two liquids are the same, due to the fact that the liquid levels are maintained substantially the same. The partial vacuum in the mixing tank 1 of course is the same in creating a flow of syrup and water through the respective pipes. However, with the heads in the respective tanks, 32 and 30 maintained the same or substantially the same, and the vacuum effecting a flow from these tanks being the same, by adjusting the diameters of the pipes 44 and 35, the relative volume of flow of liquid and syrup into the mixing tank may be maintained.

In the operation of the device so far as is described, water and syrup, as heretofore described, are delivered to the syrup tank 30 and the water tank 32. A vacuum is drawn in the mixing tank. The calibrated valve 36 is set to pass the desired quantity of the syrup and the calibrated valve 42 is set to deliver the predetermined quantity of water, the respective quantities of water and syrup being determined by the proportion of syrup to water, ultimately desired. Under these conditions, the syrup and water will flow through their respective pipes 35 and 41 through the solenoid valve 43 and through the nozzle 21 into the dome 2 of the tank. As the water falls, it will drop into the top pan 17 overflowing over the annular flange 16 into the pan 13. The mixture flows along pan 13 toward the column 8 and into the pan 14', whence it flows outwardly over the upturned flange of this pan 14' and into the pan 14. From the pan 14, it flows inwardly down along the column 8, thereby becoming thoroughly mixed during this passage back and forth in the pans. Eventually, the mixture will reach the pan 19, part of the same flowing out and over the top of the pan and part down through the escape openings 20 striking against the top 10 of the spider and eventually flowing into the bottom of the tank to be discharged, as heretofore described, through the discharge pipe 52. If, for any reason, the withdrawal of the mixed water and syrup from the tank is stopped or is so slow as to cause a backing up of the mixture in the tank, the float 29 will rise with the rise of the liquid level in the tank, ultimately closing the valve 25 and shutting off further supply to the tank until the level drops.

The flowing of the water and syrup through the common inlet nozzle helps to mix the two liquids and the continued flow of the mixed liquids in the pans 13, 14, 17 and 19 has a further tendency to mix the liquids, so that by the time they are delivered to the bottom of the tank, a thorough mixture of the syrup and water is accomplished. Due to the fact that the mixed syrup and water flows in a thin film over the column 8, a more thorough deareation of the mixture is accomplished, it being borne in mind that a constant vacuum is maintained in the mixing tank 1.

It is almost essential that if, for any reason, the liquid level in either of the tanks 30 or 32 falls to an extremely low point where no liquid would be supplied to the mixing tank, the flow to the mixing tank should be cut off. It is quite obvious that in order to have a more or less fully automatic structure, a continuous flow of the predetermined quantities of syrup and water should be maintained and if, for any reason, this continuous flow of one or the other should stop, delivery to the mixing tank should stop, otherwise the proportionate amounts of syrup and water would be thrown entirely out of balance. In Fig. 3, we have shown a form of control which is used on each of the tanks. It is illustrated and described, however, only as the water inlet tank. Arranged to be projected into the tank 32 is a series of electrodes or contact members 53, 54 and 55, supported in an insulated head 56 threaded into a hollow boss 57. These electrodes project to different levels into the tank and the electrodes 53 and 54 are connected to a solenoid 58 (Fig. 4) controlling the operation of the valve 46. By this arrangement, when the liquid in the tank 32 falls below the electrode 54, a suitable relay is operated, controlling the circuit of the solenoid 58 which operates the solenoid to open the control valve 46 permitting the inflow of liquid to the tank. This inflow continues until the liquid level has reached its high point and contacts electrode 53. When contact is made with electrode 53, a relay is operated controlling the solenoid 58 which closes the circuit through the solenoid for the purpose of closing the valve 46 which remains closed until, as heretofore stated, the level drops below electrode 54.

The electrode 55, it is to be noted, projects almost to the bottom of the tank and when the liquid gets to this low point, it is reaching the danger mark. Therefore, the circuit arrangement is such that when the liquid drops below the electrode 55, a relay is operated, controlling a solenoid 59 which, in turn, controls a valve 43 and under these circumstances, the solenoid operates to shut the valve 43, therefore shutting off all supply of liquid from either tank to the mixing tank until the level of the liquid in the auxiliary or supply tank has been raised above the danger point. Of course, as soon as the liquid level is raised to the point where it engages the end of the electrode 55, the valve 43 is opened and flow of the liquids into the tank may continue.

Under normal operations, with the liquid in both of the tanks above the danger mark, the solenoid 59 normally operates to maintain the valve 43 open.

It is to be noted that the above system provides for a steady and uniform flow of syrup and plain cold water, the two being calibrated to deliver a proper proportional amount, into a mixing tank, wherein a vacuum is maintained. The mixed syrup and water is deaerated in the vacuum tank and after the deaeration of the mixture, this mixture is delivered to a carbonator where the mixture as a whole is carbonated and is then ready for delivery to the filling apparatus. As a result of this system, not only is the water for the beverage deaerated before carbonation but the syrup itself which it has been found contains considerable air, is deaerated, thus permitting the absorption, during the carbonating process, of a greater quantity of $CO_2$ and, of course permits the absorption of the $CO_2$ more rapidly. As the result of the above process, not only is the carbonation of the mixture facilitated, but, due to the fact that the syrup of the mixture is deaerated and absorbs the $CO_2$, the keeping qualities of the beverage is materially increased. There is a tendency for the yeast cells to generate in the sugar, forming the base of the syrup, and this is accelerated by the presence of air in the syrup. With the removal of this air from the syrup and the absorption into the syrup of the $CO_2$, the development of these cells in the sugar content of the syrup is largely prevented.

In Fig. 4, I have illustrated a schematic drawing of the circuit connections for controlling the various valves, heretofore described. In this drawing, it is to be noted that electrodes 53 and 54 for the water tank are connected in a circuit 60 including the solenoid 58 which circuit also includes a relay 61 in turn connected to the supply lines 62. The electrode 55 is connected in a circuit including a relay 63 in turn connected to the supply lines and controlling the operation of the solenoid 59.

The syrup tank electrodes 53' and 54' are included in a circuit 64 which includes a solenoid 65 for the syrup tank valve, and this solenoid is included in the circuit of a relay 66 connected to the supply lines. The electrode 55' is included in the circuit embracing the mixing tank relay 63 so that this relay controls the mixing tank valve solenoid 59.

Through the medium of a hydrometer enclosed in the glass casing 67 communicating with the tank 1 through the tube 68, we are provided with a visual check of the specific gravity of the mixture.

In Fig. 1, we have shown the carbonator at a higher elevation than the delivery pipe 52 and the bottom of the mixing tank. Accordingly, we have provided a pump between the carbonator and the mixing tank which creates a vacuum or partial vacuum in the pipe 52 substantially equal to the vacuum in the mixing tank. It is obvious, of course, that if desired the carbonator could be placed at a lower elevation than the bottom of the mixing tank. Under these circumstances the pump in the line 52 may be dispensed with as the carbonator pump itself could be caused to create in the pipe 52 a vacuum or partial vacuum substantially equal to that of the mixing tank. Under these circumstances, gravity alone would be relied on for delivery from the mixing tank to the carbonator.

We claim as our invention:

1. In an apparatus for preparing a carbonated beverage, in combination, a mixing tank, a water tank associated therewith, a conduit extending between said water tank and said mixing tank, a syrup tank associated with said mixing tank, a conduit connecting said syrup tank with said mixing tank, means for maintaining a partial vacuum in said mixing tank for producing the flow of syrup and water into said tank, a calibrated valve for controlling the quantity of water passing through the water conduit, a second calibrated valve for controlling the quantity of syrup passing through the syrup conduit, means for shutting off the flow of syrup and water into said mixing tank under predetermined conditions, a carbonator and means for delivering the mixed syrup and water from said mixing tank to said carbonator.

2. In an apparatus for preparing carbonated beverage, in combination, a mixing tank, means for producing a vacuum in said tank, a vertically disposed dome arranged within said mixing tank, a plurality of liquid receiving pans arranged in series, one above the other, disposed at the top of said column and delivering against the side walls of said column, an inlet nozzle arranged in the top of said mixing tank, a syrup tank associated with the mixing tank and delivering to said inlet nozzle, a water tank associated with said column and delivering to said nozzle, means for controlling the rate of flow of said water from said water tank to said nozzle, and means for controlling the rate of flow of syrup from said syrup tank to said nozzle, and means responsive to the liquid level in said tank for controlling the inlet nozzle.

3. In an apparatus for preparing carbonated beverage, in combination, a mixing tank, an inlet nozzle arranged in the top of said mixing tank, a water tank associated with said mixing tank, a syrup tank associated with said mixing tank, both of said tanks communicating with said inlet nozzle, and means for automatically shutting off the flow through said nozzle, when the liquids in either said water or said syrup tank falls below a predetermined level.

4. In an apparatus for preparing carbonated beverage, in combination, a mixing tank, an inlet nozzle arranged at the top of said tank, a syrup tank associated with said mixing tank and communicating with said inlet nozzle, a water tank associated with said mixing tank and communicating with said nozzle, means for shutting off the flow of liquid through said nozzle into said mixing tank in event the liquid in either the water tank or the syrup tank falls below a predetermined level, and means for shutting off the flow of liquid through said inlet nozzle when the liquid in the mixing tank rises above a predetermined level.

5. In an apparatus for preparing a carbonated beverage, in combination, a mixing tank, an inlet nozzle arranged in the top of said tank, a syrup tank associated with said mixing tank communicating with said nozzle, a water tank associated with said mixing tank and communicating with said nozzle, means for maintaining a partial vacuum in said mixing tank for creating a flow from said water and syrup tanks into said mixing tank and for deaerating the mixed liquids in said mixing tank, said water tank being adapted for connection with a water supply and said syrup tank being adapted for connection with a syrup supply, means for shutting off the inflow of water to said water tank when the liquid in said water tank rises to a predetermined level, means for shutting off the inflow of syrup through said syrup tank when the liquid in said tank rises to a predetermined level, means for shutting off the inflow through said nozzle and means controlled by the liquid level in each said water and syrup tanks for operating said shut off means when the liquid level in said syrup or water tank falls below a predetermined level.

6. In an apparatus for preparing a carbonated beverage, in combination, a mixing tank, a water tank delivering to said mixing tank, a syrup tank delivering to said mixing tank, means for supplying said water and syrup tanks respectively with water and syrup, means for shutting off the supply of water or syrup to said tanks when the liquid level in said tanks rises above a predetermined point, and means for shutting off the flow of liquid to said mixing tank when the liquid in either said water or syrup tanks falls below a pre-determined level.

7. In an apparatus for preparing a carbonated beverage, in combination, a mixing tank having a cylindrical dome supported therein, a plurality of filming pans surrounding said dome, spaced apart from the periphery thereof and vertically spaced on said dome, an inlet in the top of said tank, a water tank supported on one side of said mixing tank, a syrup tank supported on one side of said tank, a conduit leading from said syrup tank to said mixing tank inlet, and a second conduit leading from said water tank to said mixing tank inlet, the diameter of said water tank conduit being greater than the diameter of said syrup tank conduit, means for maintaining the liquid level in said tanks substantially equal, whereby the liquid heads in the two tanks will be maintained the same, and means for creating a partial vacuum in said mixing tank for transferring the liquids in said syrup and water tanks to said mixing tank and for deaerating said liquids as they flow into said mixing tank.

8. In an apparatus for preparing a carbonated beverage, in combination, a mixing tank, a cylindrical filming dome supported in said tank, filming pans supported on said dome in vertical spaced relation, said pans being spaced from the periphery of the dome, a water tank supported on one side of said mixing tank and a syrup tank supported on one side of said mixing tank, a common inlet arranged in the top of said mixing tank, conduits extending from said water tank and said syrup tank to said common inlet, means for creating a partial vacuum in said mixing tank for effecting a flow of liquids through said conduits into said tank and for deaerating said liquids as they pass down through said tank, a valve for controlling the ingress of liquids through said common inlet and means for closing said valve when the liquid in either said water tank or syrup tank falls below a predetermined level.

9. In an apparatus for preparing a carbonated beverage, in combination, a mixing tank, a filming dome mounted within said tank, filming pans supported on said dome in vertical spaced relation and spaced from the periphery of said dome, a water tank supported on one side of said mixing tank and a syrup tank supported on another side of said mixing tank, said tank having a common inlet, a conduit extending from said syrup tank to said common inlet, a conduit extending from said water tank to said common inlet, means for creating a partial vacuum in said mixing tank for effecting a flow of liquids from said water and syrup tanks through said conduits, said water tank being adapted for connection with a source of water supply and said syrup tank being connected with a source of syrup supply, a valve for controlling the admission of water and syrup into the respective tanks from the source of supply, means responsive to the liquid levels in said tanks for controlling the operation of said valves, a valve controlling the liquid inlet to said mixing tank and means responsive to the liquid level in said mixing tank for controlling the operation of said valve.

JAMES KANTOR.
EDWARD F. ROSENBERG.

REFERENCES CITED

The following references are of record in the file of this patent:

UNITED STATES PATENTS

| Number | Name | Date |
|---|---|---|
| 403,377 | Rogers | May 14, 1889 |
| 945,143 | Szamek | Jan. 4, 1910 |
| 1,037,135 | Tomlinson | Aug. 27, 1912 |
| 1,237,144 | Allen | Aug. 14, 1917 |
| 1,491,049 | Lichtenthaeler | Apr. 22, 1924 |
| 1,513,354 | Wadsworth | Oct. 28, 1924 |
| 1,549,894 | Adams | Aug. 18, 1925 |
| 1,578,187 | Bullock et al. | Mar. 23, 1926 |
| 1,671,601 | Mills | May 29, 1928 |
| 1,749,561 | Cadman | Mar. 4, 1930 |
| 1,768,158 | Shields | June 24, 1930 |
| 1,816,144 | Dick | July 28, 1931 |
| 2,065,128 | Eisinger | Dec. 22, 1936 |
| 2,075,126 | Marden | Mar. 30, 1937 |
| 2,151,644 | Stephens | Mar. 21, 1939 |
| 2,203,388 | Kantor | June 4, 1940 |
| 2,227,101 | Meyer | Dec. 31, 1940 |
| 2,248,184 | Newton | July 8, 1941 |
| 2,285,973 | Hopkins | June 9, 1942 |

FOREIGN PATENTS

| Number | Country | Date |
|---|---|---|
| 540,002 | Great Britain | 1941 |